United States Patent [19]
Mangold et al.

[11] Patent Number: 5,926,232
[45] Date of Patent: Jul. 20, 1999

[54] METHOD FOR OPTIMIZING THE TRANSMISSION OF SIGNALS

[75] Inventors: Peter Mangold; Rodolfo Mann Pelz, both of Hannover, Germany

[73] Assignee: Robert Bosch GmbH, Germany

[21] Appl. No.: 08/738,681

[22] Filed: Oct. 28, 1996

[30] Foreign Application Priority Data

Oct. 26, 1995 [DE] Germany ............................ 195 39 912
Feb. 2, 1996 [DE] Germany ............................ 196 03 725

[51] Int. Cl.⁶ ............................................ H04N 7/14
[52] U.S. Cl. ............................................ 348/845.1; 371/41
[58] Field of Search ................ 348/845.1; 370/465; 375/245, 254; 371/41, 5.5; H04N 7/14

[56] References Cited

U.S. PATENT DOCUMENTS

| | | | |
|---|---|---|---|
| 5,511,079 | 4/1996 | Dillon | 371/41 |
| 5,515,377 | 5/1996 | Horne | 370/465 |
| 5,533,004 | 7/1996 | Jasper | 370/465 |
| 5,568,200 | 10/1996 | Pearlstein | 348/845.1 |
| 5,600,663 | 2/1997 | Ayanoglu | 371/41 |
| 5,627,845 | 5/1997 | Asano | 371/41 |
| 5,640,333 | 6/1997 | Hawkins | 370/465 |

FOREIGN PATENT DOCUMENTS

| | | |
|---|---|---|
| 0651531 | 5/1995 | European Pat. Off. . |
| 0727891 | 8/1996 | European Pat. Off. . |
| 2253546 | 9/1992 | United Kingdom . |

*Primary Examiner*—Howard W. Britton
*Attorney, Agent, or Firm*—Fulbright & Jaworski, LLP

[57] ABSTRACT

In a method for optimizing the transmission of signals, especially video signals, over a channel with a predetermined channel data rate after source encoding for data reduction and channel encoding, in which redundancy is added to the source-encoded signals for error control protection, at least one quality parameter of the transmitted and decoded signals is measured. As a function of the measured quality parameter, the relationship between the source accuracy of the source encoding and the added redundancy is changed in opposite directions to optimize the transmission.

14 Claims, 3 Drawing Sheets

| BE | QP | RU | RU/RV | R | RV |
|---|---|---|---|---|---|
| $0 \leq BER < p_0$ | 1 | 32 | 1 | 0 | 32 |
| $p_0 \leq BER < p_1$ | 2 | 24 | 2/3 | 8 | 32 |
| $p_1 \leq BER < p_2$ | 3 | 16 | 1/2 | 16 | 32 |
| $p_2 \leq BER < p_3$ | 4 | 8 | 1/4 | 24 | 32 |

METHOD FOR OPTIMIZING THE TRANSMISSION OF SIGNALS

BACKGROUND OF THE INVENTION

The invention pertains to a method for optimizing the transmission of signals, especially video signals, over a channel with a predetermined channel data rate after a source encoding for data reduction and a channel encoding, according to which method redundancy is added to the source-encoded signals for error control protection.

Because of the limited resources for the transmission of information (video, audio, data) in existing and future networks, additional measures are taken to maximize the system capacity with respect to number of users, types of service, and applications.

A considerable degree of data reduction is achieved by means of parametric source encoding methods such as MPEG1, MPEG2, and MUSICAM. Here the encoded signal is composed of various sets of parameters with different information contents. As a result, however, there is usually a selective sensitivity of the encoded signals to transmission errors. So-called hierarchical video encoding methods are characterized by an encoded sequence, which is composed of several partial sequences; these partial sequences originate from corresponding encoding processes with different degrees of resolution, and they therefore also have different sensitivities to error. It can be assumed that future object-oriented source encoding methods such as MPEG4 will also be characterized by the nonuniform error sensitivity of their various objects and/or partial objects.

SUMMARY OF THE INVENTION

The object of the present invention is to make it possible to optimize the transmission of signals especially in the presence of time-variant channel properties such as those present in mobile radio networks.

This object is accomplished by measuring at least one quality parameter of the transmitted and decoded signals, and, as a function of the measured quality parameter changing, the relationship between the source accuracy of the source encoding and the added redundancy in opposite directions to optimize the transmission.

In an elaboration of the invention, it is provided that the relationship between the source accuracy of the source encoding and the added redundancy is also dependent on quality indicators pertaining to the source information to be encoded. The quality indicators can be, for example, the local and/or the temporal resolution of an image to be transmitted.

According to a preferred embodiment, the measured quality parameter is transmitted via a channel going in the opposite direction to a device controlling the source encoding and the channel encoding. The return channel necessary for this is already present in many networks designed for the transmission of data-reduced signals. Such networks include, for example, mobile radio networks with bidirectional transmission of video signals. Instead of the communications channel, it is also possible in the case of digital mobile radio networks to use various signaling channels as return channels.

According to another embodiment the measured quality parameter is used to change, in opposite directions, the relationship between the source accuracy of the source encoding and the added redundancy of the channel going in the opposite direction.

Because of the time-variant propagation conditions, the functional system components must be reconfigured or adapted of as a function of the instantaneous channel properties to ensure a certain quality of service. Because this is possible only in discrete steps, in a further elaboration of the invention the source accuracy and the redundancy can be changed in a stepwise manner and the change is carried out as a function of the measured quality parameter as part of an iteration process.

In another embodiment, a reliable assessment of the quality of the transmitted and decoded signals is provided by using the residual error rate found at the output of the channel decoder as the quality parameter.

In a further elaboration of the invention, the residual error rate can be determined by obtaining reliability information during the channel decoding of the transmitted signal; averaging the reliability information over the short term; mapping the reliability information averaged over the short term to detect residual error; comparing the variable obtained by mapping with at least one decision threshold; and transmitting the result of the comparison as the residual error information. It is preferable for the short-term averaging to be carried out in each case over one block of the channel-decoded signal.

The reliability information can be obtained by the use of the soft-output Viterbi algorithm or by other methods, such as those described in J. Huber and A. Rüpel: "Zurerlässigkeitsschätzung für die Ausgangssymbole von Trellis-Decodern" [Reliability Estimation for the Output Sysmbols of Trellis Decoders], AEÜ, Vol. 44, No. 1, pp. 8–21, 1990.

This elaboration offers the advantage that there is no need to add any additional redundancy (such as additional parity bits) to the transmitted signal to detect residual errors.

In an advantageous embodiment of this elaboration the reliability information is also averaged over the long term; and the variable obtained by the mapping step is multiplied by an additional variable obtained by the mapping of the long-term average reliability information to detect residual error.

The method according to the invention gives good results when the short-term average reliability information is mapped to detect residual error with the help of a continuously decreasing function, preferably a polynomial.

The long-term average reliability information can be mapped to detect residual error by means of a decreasing function which has a negative discontinuity in the middle value range. As a result, the values of the long-term average reliability information are considerably reduced, which means that the subsequent signal processing becomes much simpler.

Details on the course of the functions are to be determined by the expert in the individual case on the basis of the special application and the specific signals to be processed.

In a preferred application of the method according to the invention the channel is a mobile radio channel with a channel data rate of 32 kilobits/second. This does not mean, however, that the application to other channels or to other transmission methods is excluded.

DETAILED DESCRIPTION OF THE PREFERRED EMBODIMENTS

Figure 1:
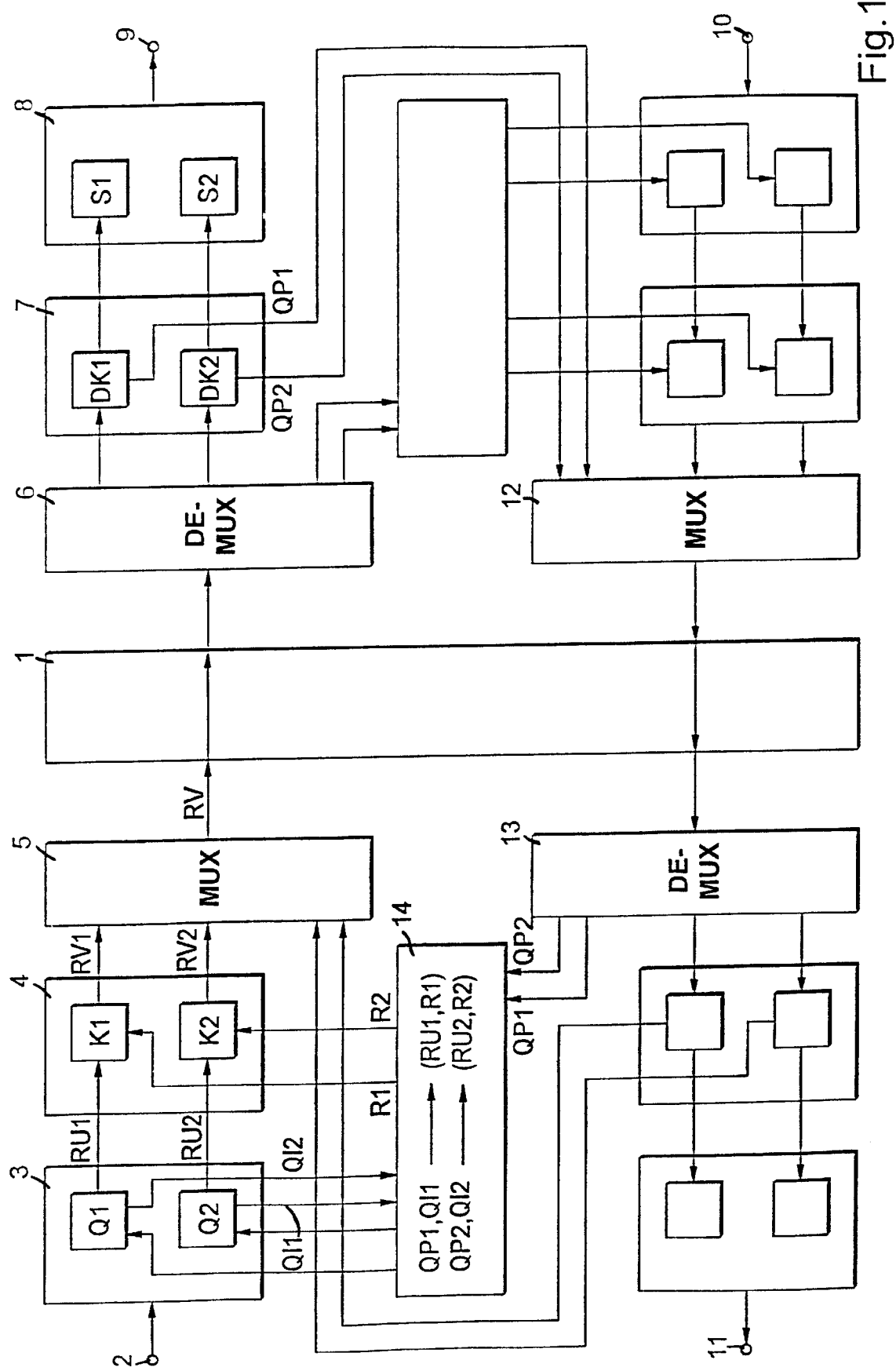
FIG. 1 is a functional block diagram of a first device for implementing the method according to the invention.

FIG. 1 shows the bidirectional transmission of signals, such as video signals, over a telecommunications network 1 between two terminals. In one direction, signals arriving at 2 are encoded first in a source encoder 3 and then in a channel encoder 4 and then sent via a multiplexer 5 to a transmission channel of telecommunications network 1. After passing though a demultiplexer 6, the transmitted signals arrive at a channel decoder 7 and then at a source decoder 8, from the output 9 of which the decoded, transmitted signals can be taken.

A signal path of similar design is used for the encoded transmission of signals in the opposite direction between an input 10 and an output 11. This inverse channel is described in the following only insofar as it is necessary for the implementation of the method according to the invention for the signals transmitted between input 2 and output 9.

In many methods for signal encoding, several sets of parameters are formed, which are intended to be transmitted more-or-less simultaneously. In the hybrid video source encoder presented in FIG. 2 of the above-cited publication, for example, seven parameter sets are provided as output signals. For the sake of clarity, FIG. 1 shows only two parameter sets, which are generated by sources Q1 and Q2 in source encoder 3. The data rates generated by Q1 and Q2 are RU1 and RU2, respectively. Source encoder 3 also transmits quality indicators QI1 and QI2. Redundancies R1 and R2 are added to the parameter sets in partial channel encoders K1 and K2, respectively, so that errors which occur during transmission can be detected and possibly corrected. In multiplexer 5, the signals with data rates RV1 and RV2 and other signals are combined.

After transmission and a separation in demultiplexer 6, the transmitted signals arrive at channel decoders DK1 and DK2, from which the channel-decoded signals are sent to source decoders S1, S2 and are finally made available in decoded form at output 9.

Channel decoders DK1 and DK2 also generate signals QP1 and QP2, which are quality parameters which describe the quality of the transmitted and channel-decoded signals. An example of the derivation of these signals will be explained later in conjunction with FIG. 3. Quality parameters QP1 and QP2 are transmitted via a multiplexer 12, the return channel of telecommunications network 1, and a demultiplexer 13back to the first party. There they are separated in demultiplexer 13 from the useful signals of the return channel and sent to a processor 14.

Processor 14 derives from the respective values of the signals QI1, QP1 and QI2, QP2 the most favorable pairing between the output data rate of the source encoder (source data rates RU1 and RU2) and the added redundancies R1, R2. This is done for each parameter set, so that QI1 and QP1 are used to select a pairing of RU1 and R1, and QI2 and QP2 are used to select a pairing of RU2 and R2. In networks with a constant bit rate, it is must be remembered that the sum of all the parameter sets after channel encoding must corresponding to this constant bit rate.

Figures 2, 3:
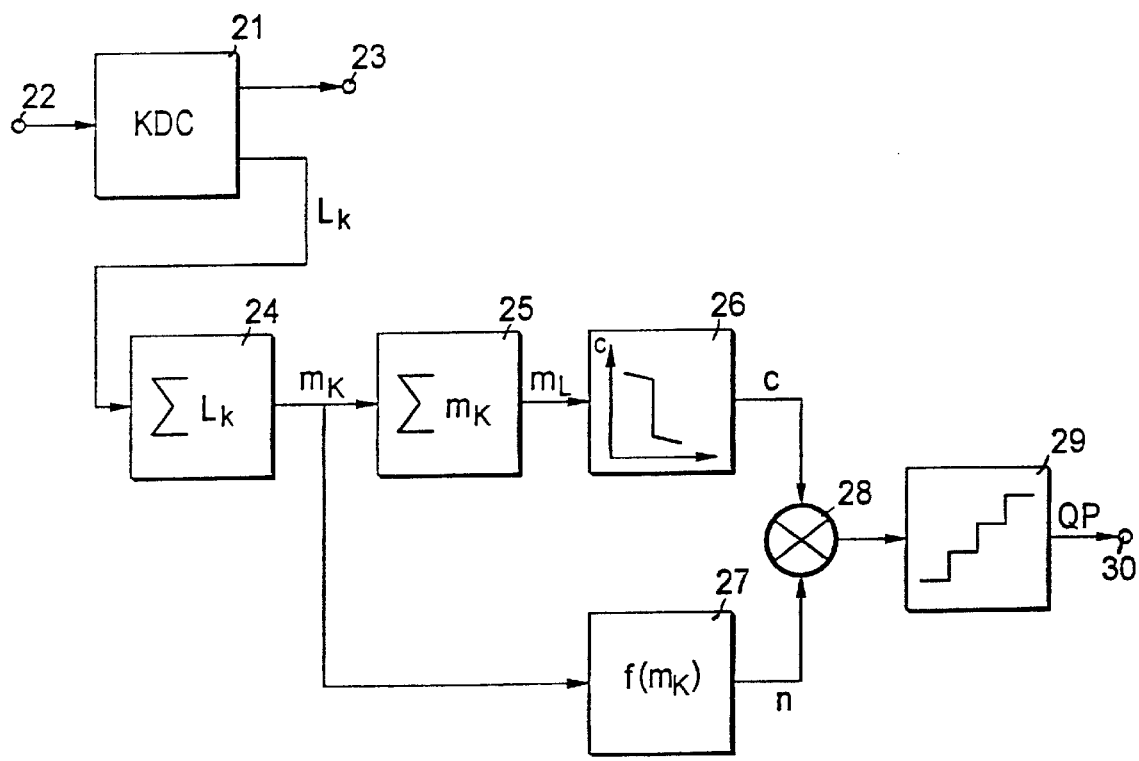
FIG. 2 is a table showing the available redundancy at different data rates.
FIG. 3 is a functional block diagram showing the derivation of a quality parameter from a received signal.

This optimization process is described in greater detail on the basis of the table shown in FIG. 2, where, for the sake of clarity, only one parameter set is assumed, for which the entire channel of 32 kilobits/second is available. The table assumes that the source encoder can be switched between data rates of 8, 16, 24, and 32 kilobits/second. If the source encoder is working at a data rate of 32 kilobits/second, it is no longer possible to add any redundancy during channel encoding; this means that the encoding rate is equal to 1. At the source data rate of 24, 8 kilobits/second of redundancy are added, which results in an encoding rate of 2/3. At 16 kilobits/second, the encoding rate is 1/2; and at 8 kilobits/second, the encoding rate is 1/4. These four pairings depend on four possible values of the quality parameter QP. Channel decoder 7 is designed in correspondence with this so that the quality parameters QP1 and QP2 are quantized in four value ranges, the limits of which are located at $P_0$, $P_1$, and $P_2$.

At a very small error rate of, for example, $\leq P_0$, the source data rate is set at 32 kilobits/second and the encoding rate at 1.

FIG. 3 shows an exemplary embodiment of the acquisition of quality parameter QP. Channel decoding DK1 or DK2 (FIG. 1) occurs with, for example, the use of the soft-output Viterbi algorithm (SOVA). Channel decoder 21 has not only an input 22 and an output 23 for the channel-decoded signal but also an output for reliability information.

The reliability information from channel decoder 21 is sent first to an average value former 24, which averages the reliability information $L_k$ over the short term, that is, in this exemplary embodiment, over one block i in each case. This is done in accordance with the equation:

$$m_K(i) = \frac{1}{K} \cdot \sum_{k=0}^{K-1} L_k(i)$$

where K is the number of symbols per block, and i is the index of the block in question.

Because channels affected by memory are involved, such as mobile radio channels, the resulting transmission errors show a pronounced statistical pat tern (bundle errors). In cases where the transmitted symbols have been subjected to only limited interleaving, there is also a statistical pattern in the decoded symbols and the associated reliability information. This also occurs when a code with insufficient correctability is used.

Use can be made of this additional information by averaging the short-term averages of the reliability information over the long term. For this purpose, the short-term averages ($m_k$) are averaged at 25 according to the equation:

$$m_L(i) = \frac{1}{K} \cdot \sum_{k=i-1-M}^{i-1} m_K(k), \quad i > M$$

where M is the number of averaged blocks (memory).

The short-term averages $m_K$ and the long-term averages $m_L$ are mapped to detect residual error at 26 and 27, respectively, by means of decreasing functions. The output variables of functions 26 and 27 are multiplied at 28. The resulting product is sent via a quantizer 29 interconnected with columns BE and QP of the table according to FIG. 2 to output 30 and is available there as signal QP. This is a measure of the residual errors per block; it states only whether errors are present in a block, not how many errors there are.

Figure 4:
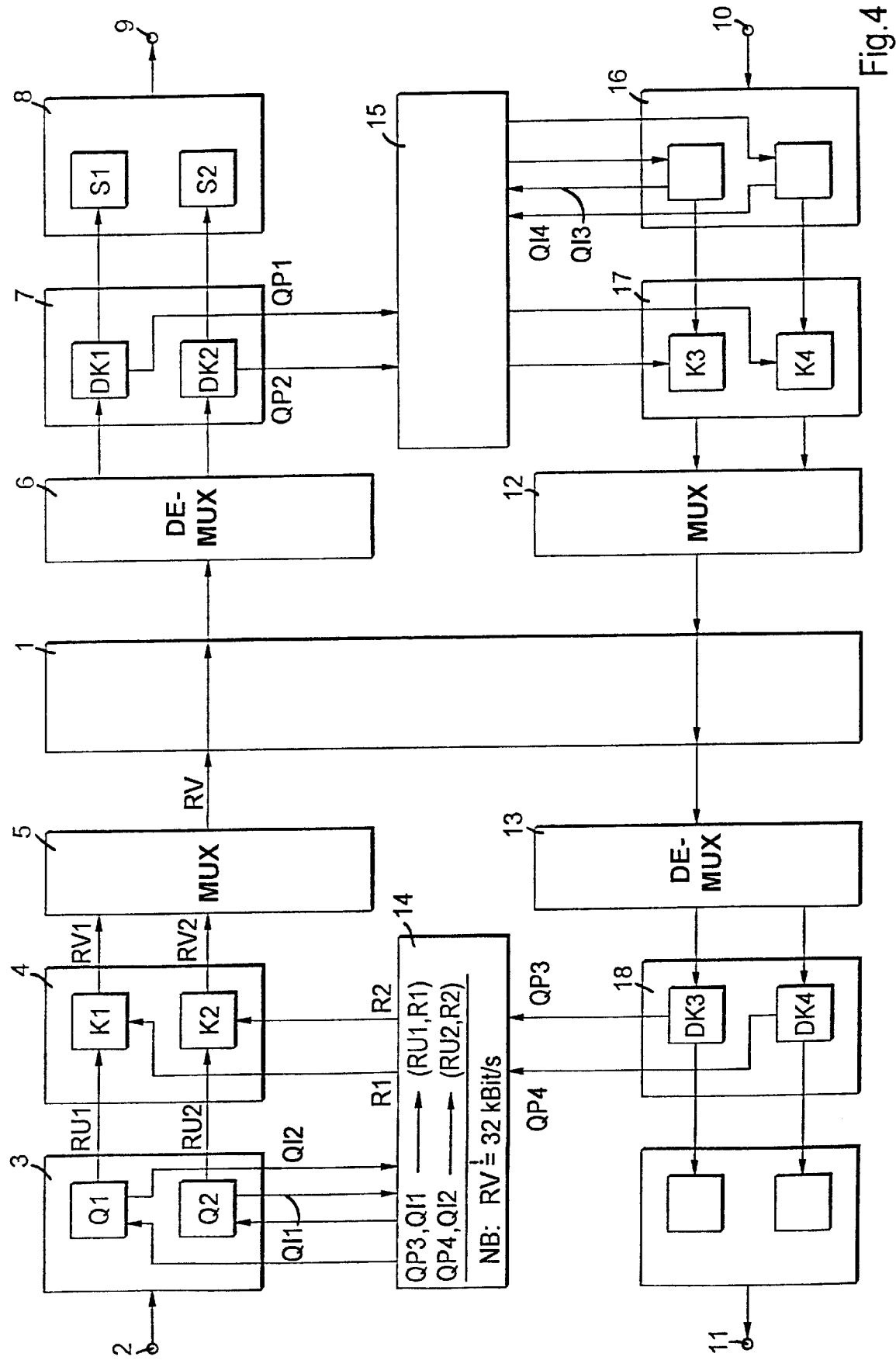
FIG. 4 is a functional block diagram of a second device for implementing the method according to the invention.

In many cases, associated channels behave very similarly in both directions, so that the quality parameters of the channel in the one direction can be used to control the channel in the other direction. An example of this is shown in FIG. 4, which otherwise corresponds to that according to FIG. 1. Quality parameters QP1 and QP2 are sent in this case, however, to a processor 15 to control source encoder 16 and channel encoder 17. In a corresponding manner, processor 14 receives quality parameters QP3 and QP4 for controlling source encoder 3 and channel encoder 4.

We claim:

1. Method for optimizing the transmission of signals, over a channel with a predetermined channel data rate after source encoding for data reduction and channel encoding, in which redundancy is added to the source-encoded signals for error control protection, said method comprising: measuring at least one quality parameter of the transmitted and decoded signals, and changing as a function of the measured quality parameter, the relationship between the source accuracy of the source encoding and the added redundancy in opposite directions to optimize the transmission.

2. Method according to claim 1, wherein the relationship between the source accuracy of the source encoding and the added redundancy also depends on quality indicators pertaining to the source information to be encoded.

3. Method according to claim 1, wherein the measured quality parameter is transmitted over a channel going in the opposite direction to a device which controls the source encoding and the channel encoding.

4. Method according to claim 1, wherein the measured quality parameter is used to change, in opposite directions, the relationship between the source accuracy of the source encoding and the added redundancy of a channel going in the opposite direction.

5. Method according to claim 1, wherein the source accuracy and the redundancy can be changed in a stepwise manner, and in that the change is carried out as a function of the measured quality parameter in an iteration process.

6. Method according to claim 1, wherein the channel is a mobile radio channel with a channel data rate of 32 kilobits/second.

7. Method according to claim 1, wherein the residual error rate found at the output of the channel decoder serves as the quality parameter.

8. Method according to claim 7, wherein the residual error rate is determined in that reliability information is obtained during the channel decoding of the transmitted signal; in that the reliability information is averaged over the short term; in that the short term average reliability information is mapped to detect residual error; in that the variable obtained by mapping is compared with at least one decision threshold; and in that the result of the comparison is transmitted as the residual error information.

9. Method according to claim 8, wherein the short-term averaging is done over one block of the channel-decoded signals in each case.

10. Method according to claim 8, wherein the reliability information is also averaged over the long term; in that the variable obtained by the mapping step is modified by the long-term average reliability information; and in that the modification is carried out by multiplying the variable obtained by the mapping step by an additional variable obtained by the mapping of the long-term average reliability information to detect residual error.

11. Method according to one of claim 9, wherein the long-term average reliability information is mapped to detect residual error by means of a decreasing function which has a negative discontinuity in the middle value range.

12. Method according to claim 10, wherein the mapping of the averaged reliability information to detect errors is carried out by means of a continuously decreasing function.

13. Method according to claim 12, wherein the continuously decreasing function is a polynomial.

14. Method according to claim 1, wherein said signal is a video signal.

* * * * *